US012621872B2

(12) United States Patent　　(10) Patent No.: US 12,621,872 B2

Marcone et al.　　(45) Date of Patent:　May 5, 2026

(54) RANDOM ACCESS

(71) Applicant: Nokia Technologies Oy, Espoo (FI)

(72) Inventors: Alessio Marcone, Munich (DE); Marco Maso, Massy (FR); Nhat-Quang Nhan, Massy (FR); Diomidis Michalopoulos, Munich (DE); Ali Karimidehkordi, Munich (DE); Daniel Medina, Munich (DE); Amir Mehdi Ahmadian Tehrani, Munich (DE); Prajwal Keshavamurthy, Munich (DE)

(73) Assignee: Nokia Technologies Oy, Espoo (FI)

( * ) Notice: Subject to any disclaimer, the term of this patent is extended or adjusted under 35 U.S.C. 154(b) by 384 days.

(21) Appl. No.: 18/484,903

(22) Filed: Oct. 11, 2023

(65) Prior Publication Data

US 2024/0163928 A1　　May 16, 2024

(30) Foreign Application Priority Data

Nov. 15, 2022　(FI) ..................................... 20226026

(51) Int. Cl.
　*H04W 74/0833*　(2024.01)
　*H04L 5/00*　(2006.01)
　*H04W 72/1273*　(2023.01)
(52) U.S. Cl.
　CPC ....... *H04W 74/0833* (2013.01); *H04L 5/0048* (2013.01); *H04W 72/1273* (2013.01)
(58) Field of Classification Search
　CPC ......... H04W 74/0833; H04W 72/1273; H04W 74/002; H04W 74/0841; H04W 74/006; H04L 5/0048
　See application file for complete search history.

(56) References Cited

U.S. PATENT DOCUMENTS

| | | |
|---|---|---|
| 2020/0305197 A1 | 9/2020 | Kim et al. |
| 2020/0351954 A1 | 11/2020 | Turtinen et al. |
| 2022/0046714 A1 | 2/2022 | Zhou et al. |
| 2022/0174685 A1 * | 6/2022 | Lee ........................ H04B 7/088 |
| 2022/0322454 A1 | 10/2022 | Choi et al. |

(Continued)

FOREIGN PATENT DOCUMENTS

| | | |
|---|---|---|
| WO | 2021/231816 A1 | 11/2021 |
| WO | 2022/152275 A1 | 7/2022 |

OTHER PUBLICATIONS

Extended European Search Report received for corresponding European Patent Application No. 23202928.0, dated March 18, 2024, 7 pages.

(Continued)

*Primary Examiner* — Kwang B Yao
*Assistant Examiner* — Patrick Yipao Pei
(74) *Attorney, Agent, or Firm* — Barta Jones, PLLC

(57)　ABSTRACT

There is provided a method, comprising: obtaining signal quality information on a plurality of downlink (DL) signals of a cell; receiving, from a network node of the cell, condition information indicative of reception conditions at the network node; based on the signal quality information and the condition information, determining at least one parameter for performing a random access to the cell; performing, based on the determined at least one parameter, the random access to the cell on a set of uplink (UL) resources.

20 Claims, 7 Drawing Sheets

(56) References Cited

U.S. PATENT DOCUMENTS

| | | | | |
|---|---|---|---|---|
| 2022/0377799 A1* | 11/2022 | MolavianJazi | ...... | H04B 7/0695 |
| 2024/0121727 A1* | 4/2024 | Zhou | .................... | H04L 5/001 |

OTHER PUBLICATIONS

"Revised WID on Further NR coverage enhancements", 3GPP TSG RAN Meeting #96, RP-221858, Agenda: 9.3.1.3, China Telecom, Jun. 6-9, 2022, 5 pages.

Finnish Application No. 20225824, "Random Access Procedure", filed on Sep. 23, 2022, pp. 1-28.

"3rd Generation Partnership Project; Technical Specification Group Radio Access Network; Solutions for NR to support non-terrestrial networks (NTN) (Release 16)", 3GPP TR 38.821, V16.1.0, May 2021, pp. 1-140.

"3rd Generation Partnership Project; Technical Specification Group Radio Access Network; NR; Physical layer procedures for control (Release 17)", 3GPP TS 38.213, V17.3.0, Sep. 2022, pp. 1-260.

"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.

"Feature lead summary on coverage enhancement for channels other than PUSCH and PUCCH", 3GPP TSG RAN WG1 #102-e, R1-2007392, Agenda: 8.8.2.3, ZTE Corporation, Aug. 17-28, 2020, pp. 1-53.

"PRACH coverage enhancements", 3GPP TSG RAN WG1 #111, R1-2211595, Agenda: 9.14.1, Nokia, Nov. 14-18, 2022, 19 pages.

"IEEE 802.11", Wikipedia, Retrieved on Oct. 3, 2023, Webpage available at : https://en.wikipedia.org/wiki/IEEE_802.11.

Office action received for corresponding Finnish Patent Application No. 20226026, dated Apr. 14, 2023, 20 pages.

"Discussion on PRACH coverage enhancements", 3GPP TSG-RAN WG1 Meeting #111, R1-2210879, Agenda: 9.14.1, Huawei, November, 14-18, 2022, 12 pages.

\* cited by examiner

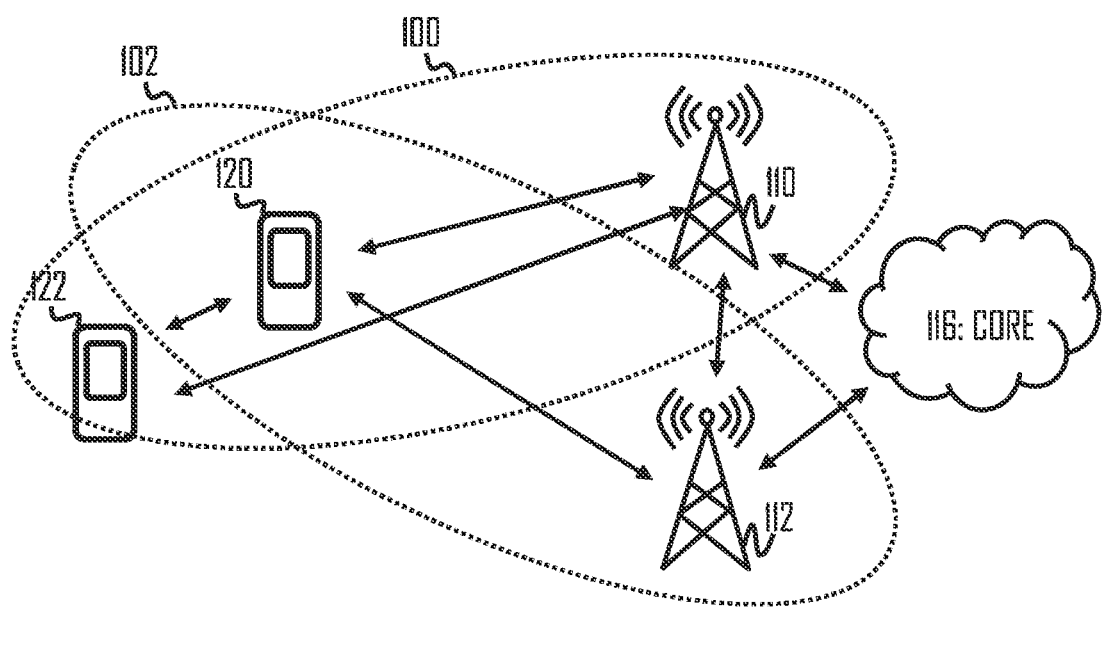

FIG. 1

```
┌──────────┐                                    ┌──────────────┐
│  120 UE  │                                    │  110 e/gNB   │
└────┬─────┘                                    └──────┬───────┘
     │                                                 │
     │           MSG1: PREAMBLE                         │
     │────────────────────────────────────────────────>│
     │                                                 │
     │           MSG2: RAR                             │
     │<────────────────────────────────────────────────│
     │                                                 │
     │     MSG3: RRC CONNECTION REQUEST                │
     │────────────────────────────────────────────────>│
     │                                                 │
     │     MSG4: CONTENTION RESOLUTION                 │
     │<────────────────────────────────────────────────│
     │                                                 │
     │        RRC RESPONSE+SETUP                       │
     │<────────────────────────────────────────────────│
     │                                                 │
     ●                                                 ●
```

FIG. 2

400: OBTAIN SIGNAL QUALITY INFORMATION ON A PLURALITY OF DL SIGNALS OF A CELL

402: ACQUIRE CONDITION INFORMATION INDICATIVE OF RECEPTION CONDITIONS AT NETWORK

404: BASED ON THE SIGNAL QUALITY INFORMATION AND THE CONDITION INFORMATION, DETERMINE AT LEAST ONE PARAMETER FOR PERFORMING A RANDOM ACCESS TO THE CELL

406: PERFORM THE RANDOM ACCESS ON A SET OF UL RESOURCES

404

500: SELECT THE DL SIGNAL TO WHICH THE RANDOM ACCESS IS ASSOCIATED, AND DETERMINE THE SET OF UL RESOURCES CORRESPONDING TO THE DL SIGNAL

502: DETERMINE A NUMBER OF RANDOM ACCESS REPETITIONS

| SSB # | INTERFERENCE | COLLISION RATE | LATENCY | OFFSET |
|-------|--------------|----------------|---------|--------|
| SSB #1 | 01 | 11 | 11 | 10 |
| SSB #2 | 00 | 10 | 00 | 01 |
| ... | ... | ... | ... | ... |
| SSB #N | 00 | 00 | 01 | 00 |

RANDOM ACCESS

RELATED APPLICATION

This application was originally filed as a Finnish patent application no. 20226026, on 15 Nov. 2022, which is hereby incorporated in its entirety.

TECHNICAL FIELD

Various example embodiments relate generally to random access.

BACKGROUND

Random access is a procedure used by terminal devices to acquire connection to a network. It is important provide a reliable random access procedure with a high success rate.

BRIEF DESCRIPTION

According to some aspects, there is provided the subject matter of the independent claims. Some further aspects are defined in the dependent claims.

LIST OF THE DRAWINGS

In the following, the invention will be described in greater detail with reference to the embodiments and the accompanying drawings, in which FIG. 1 presents a network, according to an embodiment;

FIG. 2 shows an example of initial access procedure, according to an embodiment;

DESCRIPTION OF EMBODIMENTS

Figure 3A:
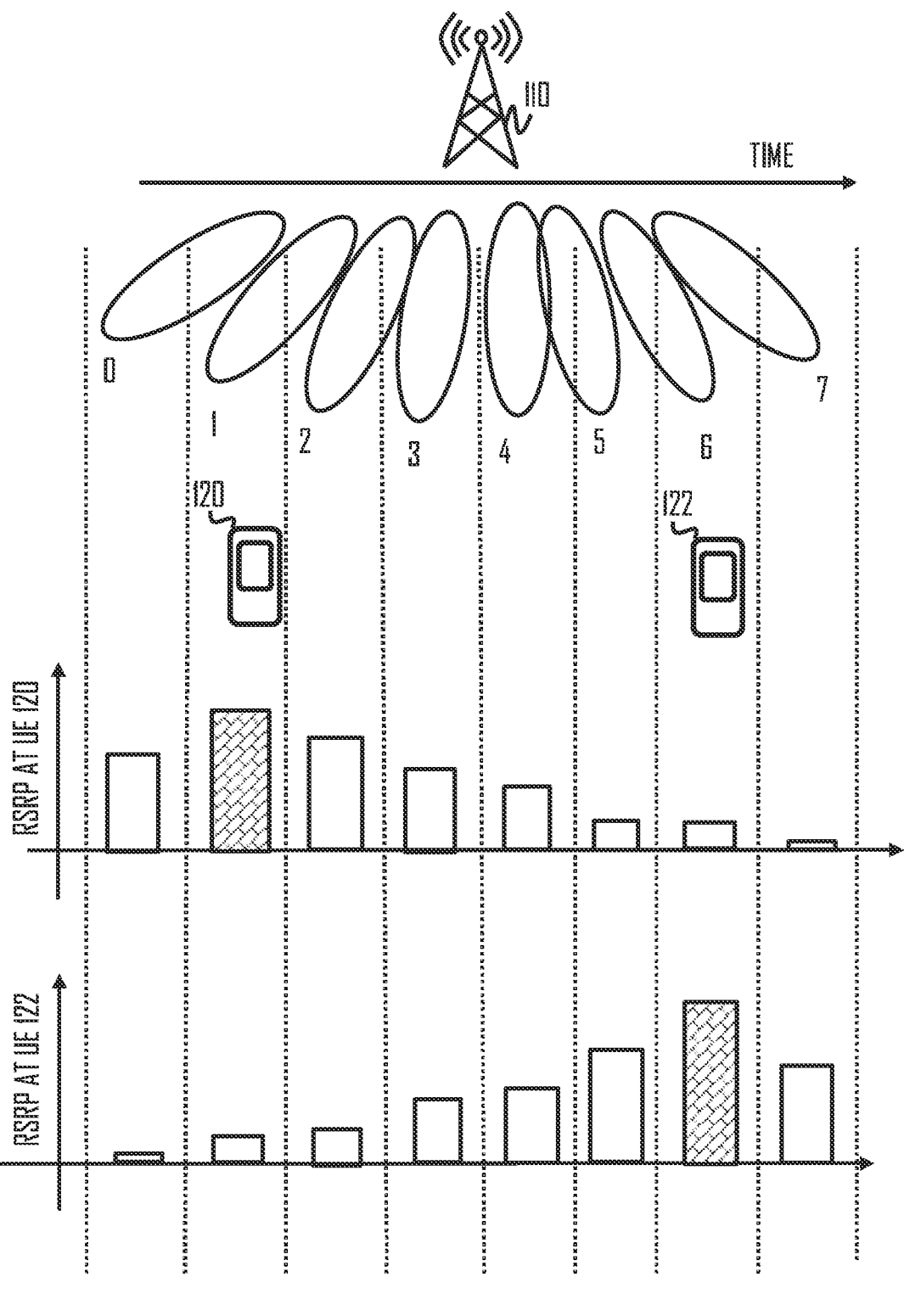
FIG. 3A shows transmission of SSBs, according to an embodiment.

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. For the purposes of the present disclosure, the phrases "at least one of A or B", "at least one of A and B", "A and/or B" means (A), (B), or (A and B). For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments.

Embodiments described may be implemented in a radio system, such as one comprising at least one of the following radio access technologies (RATs): Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and enhanced LTE (eLTE). Term 'eLTE' here denotes the LTE evolution that connects to a 5G core. LTE is also known as evolved UMTS terrestrial radio access (EUTRA) or as evolved UMTS terrestrial radio access network (EUTRAN). A term "resource" may refer to radio resources, such as a physical resource block (PRB), a radio frame, a subframe, a time slot, a subband, a frequency region, a sub-carrier, a beam, etc. The term "transmission" and/or "reception" may refer to wirelessly transmitting and/or receiving via a wireless propagation channel on radio resources The embodiments are not, however, restricted to the systems/RATs given as an example but a person skilled in the art may apply the solution to other communication systems provided with necessary properties. One example of a suitable communications system is the 5G system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integrable with existing legacy radio access technologies, such as the LTE.

The current architecture in LTE networks is distributed in the radio and centralized in the core network. The low latency applications and services in 5G may require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-topeer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications). Edge cloud may be brought into RAN by utilizing network function virtualization (NVF) and software defined networking (SDN). Using edge cloud may mean access node operations to be carried out, at least partly, in a server, host or node operationally coupled to a remote radio head or base station comprising radio parts. Network slicing allows multiple virtual networks to be created on top of a common shared physical infrastructure. The virtual networks are then customised to meet the specific needs of applications, services, devices, customers or operators.

In radio communications, node operations may in be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of work between core network operations and base station operations may vary depending on implementation. Thus, 5G networks architecture may be based on a so-called CU-DU split. One gNB-CU controls several gNB-DUs. The term 'gNB' may correspond in 5G to the eNB in LTE. The gNBs (one or more) may communicate with one or more UEs. The gNB-CU (central node) may control a plurality of spatially separated gNB-DUs, acting at least as transmit/receive (Tx/Rx) nodes. In some embodiments, however, the gNB-DUs (also called DU) may comprise e.g. a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer.

In an embodiment, the server or CU may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Some other technology advancements probably to be used are Software-Defined Networking (SDN), Big Data, and all-IP, to mention only a few non-limiting examples. For example, network slicing may be a form of virtual network architecture using the same principles behind software defined networking (SDN) and network functions virtualisation (NFV) in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customised to meet the specific needs of applications, services, devices, customers or operators.

The plurality of gNBs (access points/nodes), each comprising the CU and one or more DUs, may be connected to each other via the Xn interface over which the gNBs may negotiate. The gNBs may also be connected over next generation (NG) interfaces to a 5G core network (5GC), which may be a 5G equivalent for the core network of LTE. Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RANs. Furthermore, it may be possible to have configurations where the full protocol stack is controlled by the same HW and handled by the same radio unit as the CU.

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical and communications, future rail-way/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced Machine-Type Communication). NB-IoT focuses specifically on low cost, long battery life, and enabling a large number of connected devices. The NB-IoT technology is deployed "in-band" in spectrum allocated to Long Term Evolution (LTE)—using resource blocks within a normal LTE carrier, or in the unused resource blocks within a LTE carrier's guard-band- or "standalone" for deployments in dedicated spectrum.

The embodiments may be also applicable to device-to-device (D2D), machine-to-machine, peer-to-peer (P2P) communications. The embodiments may be also applicable to vehicle-to-vehicle (V2V), vehicle-to-infrastructure (V2I), infrastructure-to-vehicle (I2V), or in general to V2X or X2V communications.

FIG. 1 illustrates an example of a communication system to which embodiments of the invention may be applied. The system may comprise a control node 110 providing one or more cells, such as cell 100, and a control node 112 providing one or more other cells, such as cell 102. Each cell may be, e.g., a macro cell, a micro cell, femto, or a pico cell, for example. In another point of view, the cell may define a coverage area or a service area of the corresponding access node. The control node 110, 112 may be an evolved Node B (eNB) as in the LTE and LTE-A, ng-eNB as in eLTE, gNB of 5G, or any other apparatus capable of controlling radio communication and managing radio resources within a cell. The control node 110, 112 may be called a base station, network node, or an access node.

The system may be a cellular communication system composed of a radio access network of access nodes, each controlling a respective cell or cells. The access node 110 may provide user equipment (UE) 120 (one or more UEs) with wireless access to other networks such as the Internet. The wireless access may comprise downlink (DL) communication from the control node to the UE 120 and uplink (UL) communication from the UE 120 to the control node.

Additionally, although not shown, one or more local area access nodes may be arranged such that a cell provided by the local area access node at least partially overlaps the cell of the access node 110 and/or 112. The local area access node may provide wireless access within a sub-cell. Examples of the sub-cell may include a micro, pico and/or femto cell. Typically, the sub-cell provides a hot spot within a macro cell. The operation of the local area access node may be controlled by an access node under whose control area the sub-cell is provided. In general, the control node for the small cell may be likewise called a base station, network node, or an access node.

There may be a plurality of UEs 120, 122 in the system. Each of them may be served by the same or by different control nodes 110, 112. The UEs 120, 122 may communicate with each other, in case D2D communication interface is established between them.

The term "terminal device" or "UE" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In the case of multiple access nodes in the communication network, the access nodes may be connected to each other with an interface. LTE specifications call such an interface as X2 interface. For IEEE 802.11 network (i.e. wireless local area network, WLAN, WiFi), a similar interface may be provided between access points. An interface between an LTE access point and a 5G access point, or between two 5G access points may be called Xn. Other communication methods between the access nodes may also be possible. The access nodes 110 and 112 may be further connected via another interface to a core network 116 of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and there the core network may comprise e.g. an access and mobility management function (AMF) and a user plane function/gateway (UPF), to mention only a few. The AMF may handle termination of non-access stratum (NAS) signalling, NAS ciphering & integrity protection, registration management, connection management, mobility management, access authentication and authorization, security context management. The UPF node may support packet routing & forwarding, packet inspection and QoS handling, for example.

For initial access or connection establishment, a procedure called random access may be performed. Let us briefly take a look at a common RA process (also known as a (physical) RA channel ((P)RACH) procedure/process) shown in FIG. 2 between the UE 120 and the eNB/gNB 110. Although applicable to many networks, we will in the following examples focus mainly on 5G (NR), for the sake of simplicity.

In a contention based random access (CBRA) process, showed in FIG. 2, the UE 120 selects one of available PRACH preambles and transmits it in a message (Msg) 1 from the UE 120 to eNB/gNB 110. Thus, the UE sends a specific preamble to the gNB via physical random-access channel (PRACH) using a specific resource called RACH occasion (RO). As such, this message may be called PRACH message. The UE may also derive identity to the network so that network can address it in next step. The identity which UE will use may be called RA-RNTI (random access radio network temporary identity).

In next step, the gNB 110 sends a random access response (RAR) to UE 120 as Msg2 addressed to UE with the relevant RA-RNTI. Msg2 may carry the following information: Temporary C-RNTI, which is another identity given to the UE 120; timing advance (TA) value, which provides means for the UE to compensate for the roundtrip delay caused by UE's distance from the eNB/gNB; and an uplink grant resource, which is assigned as an initial resource to UE so that it can use uplink shared channel. The RAR message may also carry a preamble ID.

Then, by using the uplink shared channel, the UE 120 sends Msg3 to the network. This Msg3 may be called "RRC connection request message". At this point the UE is identified by the temporary C-RNTI. The C-RNTI may be used for contention resolution purposes.

Thereafter, the eNB/gNB may send Msg4 to the UE for contention resolution. All Msg1, Msg2, Msg3, Msg4 may be physical or MAC level messages. After the RRC connection request of Msg3 is processed, a RRC response/setup will be sent by gNB to the UE 120. In an embodiment, although not shown, the RRC message (e.g. the RRC Connection Setup message) may be multiplexed with the Msg4 (i.e. sent with the MAC contention resolution CE). Upon reception of Msg4, the UE 120 may send an ACK on a PUCCH, if its contention-resolution ID is carried by Msg4.

With contention based RA process, there is some possibility that multiple UEs send PRACH with identical signatures. This may mean the same PRACH preamble from multiple UE reaches the network (e.g. gNB) at the same time. Due to such overlap/collision, the RACH process for one or more of the UEs simultaneously attempting the RACH process with the same preamble may fail. Due to this, the network may need to rely on the contention resolution of Msg4.

However, there is another possibility to avoid collisions. In an embodiment, there are dedicated preambles for the UE to use. The network may have informed the UE which preamble signatures it should use. This kind of RACH process is called contention free random access (CFRA) procedure. In such case, the UE sends a dedicated preamble (after selecting one from a pool of dedicated preambles) and the network responds with random access response (RAR, see Msg2 above). The contention free RA process may ensure that there are no two UEs using the same preamble at the same time, thus avoiding collisions and contention resolution.

In 5G NR, two contention based random access (CBRA) procedures are supported, namely 4-step RACH, as shown with FIGS. 2, and 2-step RACH. In this description, we focus on the former for illustration purpose and simplicity, but the proposed embodiments are equally applicable to the latter.

It is worth noting that prior to Msg1, there may be also a preliminary step of UE receiving a synchronization signal block (SSB), i.e., DL beam sweeping, which is not formally part of the RACH procedure. Beam sweeping is shown in FIG. 3A. As shown, as a result of this preliminary step, the UE 120/122 typically selects the index of the preferred SSB beam (e.g. the SSB with the highest L1-RSRP measurement, which in this example SSB index 1 for UE 120 and SSB index 6 for UE 122) and decodes the associated physical broadcast channel (PBCH) e.g. for master information block (MIB), system information block (SIB). The number of SSB beams/indexes may vary according to configuration, 8 SSB beams in FIG. 3A being merely an example). The determined beam with a certain beam index (e.g. SSB beam 1 for UE 120) is also used by the UE 120 to identify a suitable RO for the preamble transmission (Msg1), according to the SSB-to-RO mapping conveyed by SIB1. The gNB 110 may use the SSB beam index selected by the UE for Msg2 transmission.

In 3GPP, there is discussion about multiple PRACH transmissions to extend the coverage of the PRACH channel. This means that a UE 120 will have a possibility to transmit PRACH (Msg1) multiple times (i.e. PRACH repetitions) before receiving a response from gNB (i.e. Msg2). This may improve detection performance. PRACH repetitions allow the gNB 110 to collect more energy from a same UE 120, that implicitly may yield an increase in the received signal-to-noise ratio (SNR).

For multiple PRACH transmissions, at least SSB-RSRP threshold(s) may be used to determine the number of PRACH transmissions on UL resources associated to at least one SSB. However, the SSB-RSRP alone could in some scenarios lead to sub-optimal choice of the number of PRACH repetitions, thus degrading network and RA performance.

Figures 3B, 4:
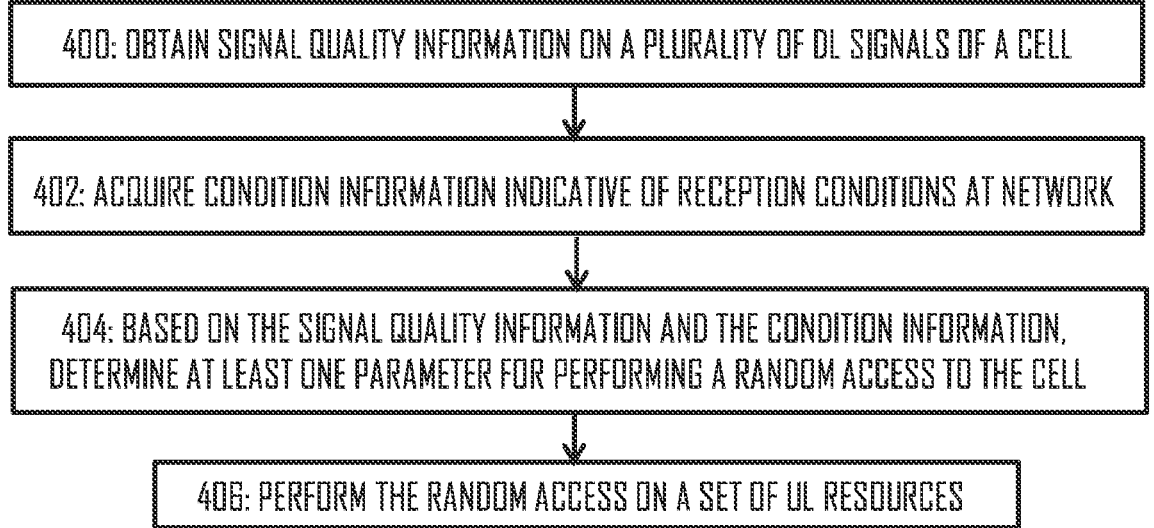
FIG. 3B shows a selection of SSB, according to some embodiments.
FIGS. 4 and 5 illustrate methods, according to some embodiments.

For example, FIG. 3B shows a selection of the SSB index and of the number of PRACH repetitions based on the measured RSRP at the UE 120. The network may beforehand configure RSRP threshold(s), based on which the UE would choose a number of PRACH repetitions. As an example, network could configure one or multiple threshold(s), and if the measured SSB-RSRP at the UE is lower than corresponding threshold, UE would perform associated number of PRACH repetitions. As an example of FIG. 3, the UE 120 having selected SSB #1 (as explained in connection of FIG. 3A) based on a measuring a highest SS-RSRP of around −82 dBm. Then the UE determines the number of repetitions as two PRACH repetitions for random access associated with SSB #1, as shown with the star-mark. The gNB may then be able to infer UE's channel conditions by the number of repetitions the UE is transmitting.

However, such an approach, which is not accounting for gNB's receiver conditions, can be challenging due to the following reasons:

The same cell-specific configuration (in form of number of beams, ROs and preambles) is used for all CE UEs in the cell, i.e. without considering differences of gNB receiver conditions across different SSB indexes. Such an approach can lead e.g. to potential Msg1 collisions or even unsuccessful RACH procedure if the interference at gNB receiver degrades the received SNR excessively.

There is no explicit/implicit indication from the gNB to the UE on the quality of time-frequency resources with respect to the potential interference and collision to neighboring UEs. Lack of such indication from gNB can increase unsuccessful Msg1 transmission from UEs using PRACH repetitions.

Currently in 3GPP, it is left for further study on whether other measured/computed metrics or conditions should be used for SSB-RSRP thresholds for the determination of the SSB and/or the number of Msg1 transmissions on the selected SSB beam. One example scenario considers a UE (such as a coverage enhanced, CE, UE) that can attempt a number of PRACH repetitions across different ROs associated to a same SSB index.

Embodiments presented in the description at least partially aim to tackle the above mentioned problems. For example, it is proposed that a gNB indicates supplementary information (called also condition information below) about gNB's receiver conditions prior to UE (such as CE UE) attempting its PRACH repetitions, so that the UE can optimize the choice of the SSB index (i.e. of the gNB beam) and/or the number of PRACH repetitions on resources associated to a certain SSB index.

FIG. 4 depicts an example method. The method may be computer-implemented. The method may be performed by the UE 120, for example, or an apparatus (such as a chip) controlling the UE 120). As shown in FIG. 4, the UE 120 may in step 400 obtain signal quality information on a plurality of downlink (DL) signals of a cell. This may take place by measuring e.g. RSRP, or some other signal quality metric, of each of the DL signals.

In an embodiment, each DL signal is a SSB, but the DL signal may instead be some other signal detectable by the UE and suitable for transmission of relevant information to the UE, possibly in a beam-wise beam sweeping transmission burst shown in FIG. 3A. As one example, the DL signal may be a channel state information reference signal (CSI-RS).

In step 402, the UE 120 receives, from a network node, such as the gNB 110, of the cell 100, condition information indicative of reception conditions at the gNB 110. This information maybe DL signal-specific, thus indicating how well the gNB 110 can receive uplink (UL) transmissions sent by the UE 120 on UL resources that are associated with the corresponding DL signal (e.g. SSB). Therefore, in an embodiment, the condition information is SSB-specific. The UL resources may refer to specific time-, frequency-, and/or spatial-domain resources of the UL transmission.

In an embodiment, the condition information related to a specific DL signal is received by the UE 120 and provided by the gNB 110 in a system information block (SIB). The SIB may be transmitted in relation to at least one of the DL signals.

In an embodiment, the condition information related to all the DL signals is provided in each DL signal of the cell, e.g. in the SIB associated to each SSB. This way a UE 120 detecting at least one SSB would be able to have the latest snapshot of the reception conditions related to all of the SSBs. In such an embodiment, each SSB beam carries the same condition information related to all the DL signals (also known as supplementary information) in the corresponding MIB and/or SIB(s). This may be beneficial as then the gNB 110 may be able to broadcast the same supplementary information to all UEs in the cell. However, it is worth noting that the condition information specific to a DL signal may be different than the condition information specific to another DL signal, although each MIB and/or SIB may provide the same condition information related to all the DL signals. As an example, the condition information can be indicated by the gNB 110 via a time-varying table in one of the SIB(s) in which information is updated according to a certain periodicity the network decides/declares.

In an embodiment the condition information is the same for some of the plurality of DL signals. This may enable SSB-grouping, where each group comprises one or more SSBs and share the condition information within the group. This may be beneficial as the resources needed to indicate the condition information may be fewer than if each SSB is provided with its own condition information. However, in another embodiment, the condition information is different for each of the DL signals (e.g. SSBs).

In step 404, based on the signal quality information and the condition information, the UE 120 then determines at least one parameter for performing a random access to the cell 100. In step 406, the UE then performs, based on the determined at least one parameter, the random access to the cell 100. The random access (RA) takes place on a set of UL resources. These UL resource may correspond to that DL signal, of the plurality of DL signals, to which the random access is associated, as will be explained. In an embodiment, performing random access comprises transmitting at least Msg1 or MsgA, depending on whether the UE 120 is performing a 2-step RACH or a 4-step RACH.

As is clear from FIGS. 3A and 3B, the UE 120 may obtain at least one signal quality threshold. This may be received from SIB or the UE 120 may be preconfigured with such at least one threshold. Then, determining the at least one parameter may further be based on comparing the signal quality information to the at least one signal quality threshold. Such at least one signal quality threshold may be shared by the plurality of DL signals (e.g. SSBs).

Figures 5, 7:
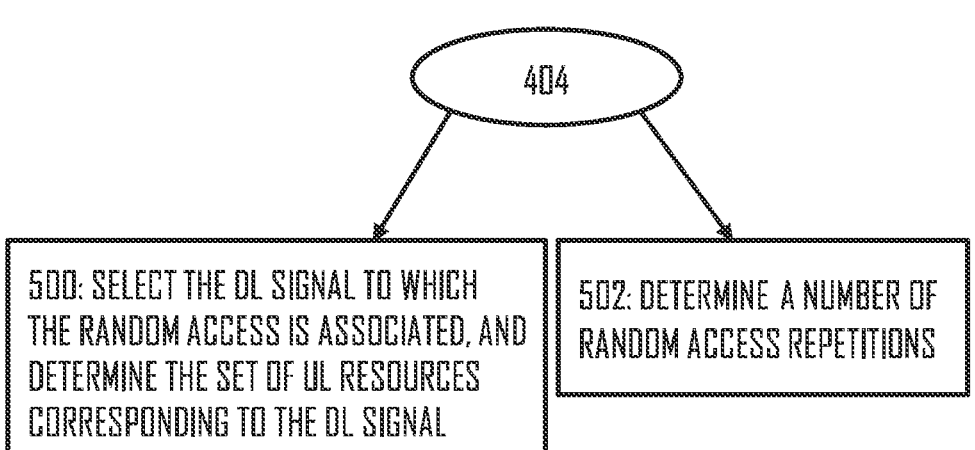
FIG. 7 illustrates an example table of condition information, according to an embodiment.

FIG. 5 shows a method for determining the at least one parameter for the random access. As shown with step 500, which is one embodiment of step 404, the UE 120 selects, based on the signal quality information and the condition information, the DL signal of the plurality of DL signals to which the random access is associated. For example, assuming the DL signal is SSB, then as shown in FIG. 3A, the UE selects one of the SSBs. However, instead of using only the SSB-RSRP as the selection criterion (shown with the star in the example of FIG. 3B), the UE 120 may advantageously base the selection also on the condition information. This may for example cause the UE 120 to select the neighboring SSB #2 which has the second highest SSB-RSRP value (as shown with the X-mark). The UE 120 may then further determine the set of UL resources corresponding to the DL signal for performing the random access. For example, as said above, the determined beam with a certain beam index (e.g. SSB beam #2 for UE 120 in this example) is also used by the UE 120 to identify a suitable RO for the preamble transmission (Msg1), according to the SSB-to-RO mapping determined by the UE based on parameters conveyed by SIB1.

Alternatively or in addition to step 500, the UE 120 may also determine, based on the signal quality information and the condition information, a number of random access repetitions allowed to be performed. For example, instead of using two PRACH repetitions as shown with the star of FIG. 3B, the UE 120 having selected SSB #2 (as shown with the X-mark) may determine that maximum number of PRACH repetitions is four, instead of two. Assuming doubling the number of repetitions increases the received signal strength by 3 dB, then this selection of the SSB #2 with four repetitions may be better choice than SSB #1 with only two repetitions.

In an embodiment, selecting the DL signal is further based on comparing the signal quality information to the at least one signal quality threshold, as is clear from the description of FIGS. 3A and 5A. In an embodiment, determining the number of random access repetitions is further based on comparing the signal quality information to the at least one signal quality threshold, as is clear from the description of FIGS. 3B and 5B.

In an embodiment, the number of repetitive transmissions of the Msg1 or MsgA is capped by the determined number of random access repetitions. In an embodiment, the UE 120 always transmits the random access message (e.g. Msg1 or MsgA) for as many times as the determined number of repetitions defines. In another embodiment, the number of repetitions defines a maximum number of repetitions allowed. In this case, if the UE 120 receives RAR from the network after sending only one or a few (but not all of the number of repetitions), the UE 120 need not transmit the RA message for as many times as defines by the number of repetitions.

In an embodiment, the condition information comprises, for at least one of the plurality of DL signals, information indicative of reception conditions related to the corresponding set of UL resources. As explained before, each DL signal (e.g. SSB) corresponds to a specific set of UL resources. The UE 120 selecting one SSB (i.e. to which the RA should be associated), the UE 120 can determine UL resources associated to the selected SSB index. When using those UL resources (i.e. set of UL resources) for transmission of, e.g. the Msg1 or MsgA, the gNB 110 has certain receiving conditions/characteristics/situation that may be different from UL resources associated to or corresponding to another SSB index. Therefore, it may be beneficial for the UE 120 to know before selecting the SSB and/or repetitions what these receiver conditions are. In an embodiment, the gNB 110 provides the reception conditions for each of the DL signals (e.g. SSBs). That is the reception condition may be SSB-specific, or in general DL signal-specific.

Figure 6:
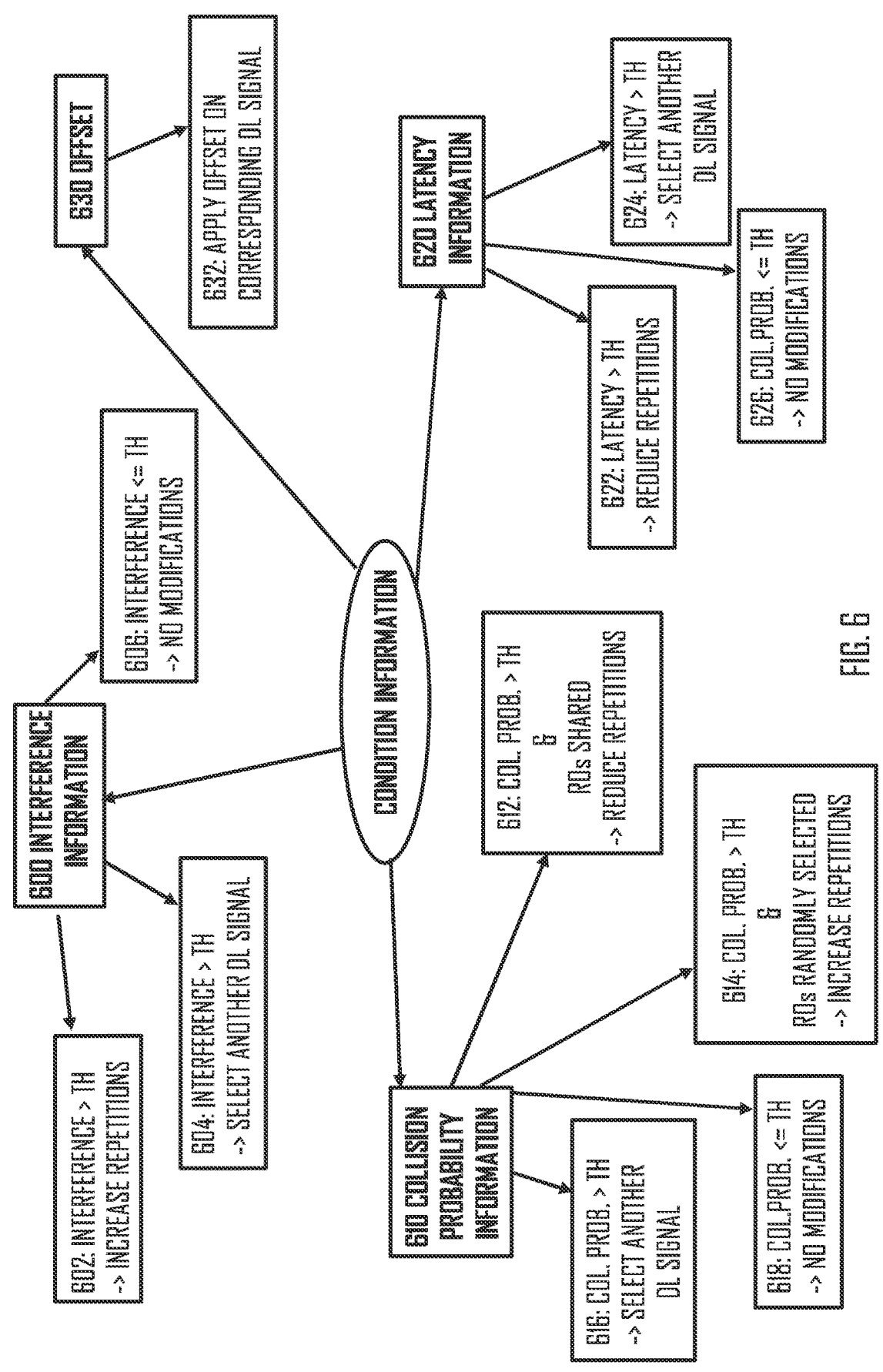
FIG. 6 shows different types of condition information and how they may be used, according to some embodiments.

In an embodiment, as shown in FIG. 6, the condition information comprises information indicative of interference 600 at the gNB 110. For example, interference and noise power (or Received Signal Strength Indicator, RSSI) of each SSB index can be included in the condition information. This indicates to the UE 120 how well the gNB can receive the UL signal, such as RA message, on UL resources associated to a given SSB index. As will be explained, the information indicative of interference may be broadcast together with at least one interference threshold to be used by the UE 120 to understand when the SSB interference may be considered too large and/or what the number of repetitions should be for a given SSB index. For example, UEs receiving such parameters may optimize the selection of PRACH repetitions and/or the selection of the SSB index based on considerations of the interference condition for the SSB index the UE is associating the random access to.

In another embodiment, the condition information comprises information indicative of a random access collision probability 610 at the gNB 110. For example, collision rate corresponding to each SSB index can be provided to the UE 120. As will be explained, the information indicative of RA collision probability may be broadcast together with at least one threshold on the collision rate, to be used by the UE 120 to understand when the collision rate on a given SSB may be considered too large and/or what the number of repetitions should be for a given SSB index. For example, UEs receiving such parameters may optimize the selection of PRACH repetitions and/or the selection of the SSB index based on consideration of the collision probability affecting the SSB index the UE is associating the random access to.

In an embodiment, the condition information comprises information indicative of an average observed latency 620, at the gNB 110, from a transmission of a preamble triggering a random access procedure to a completion of the random access procedure. As will be explained, the information indicative of latency may be broadcast together with at least one threshold on the latency, to be used by the UE 120 to understand when the latency on a given SSB may be considered too large and/or what the number of repetitions should be for a given SSB index. For example, UEs receiving such parameters may optimize the selection of PRACH repetitions and/or the selection of the SSB index based on considerations of the average observed latency from initial preamble transmission to access procedure completion.

In an embodiment the condition information comprises an offset 630 for modification of the RSRP thresholds the UE uses for determining the number of repetitions. The offset may be configured per each SSB index, to account for possible different interference conditions at each SSB beam. As will be explained, UE receiving such parameters may optimize the selection of PRACH repetitions based on adjusting the broadcast RSRP threshold according to the indicated offset to account for lower or higher interference conditions of the SSB index the UE is choosing to associate the random access to.

The condition information may comprise one or more of the above mentioned information elements 600, 610, 620, 630. For example, all the above parameters could be indicated by the gNB 110 in a table. According to one implementation of such a table, a quantized form of interference/collision rate/offset/latency (e.g. 2 bits per sample) is associated to each SSB in the table. This is illustrated I FIG. 7, as one possible form of such table. Both the gNB and the UEs in the cell may be aware of mapping between bit combinations and corresponding values of the interference/collision rate/offset/latency. The UE 120 may be informed of which at least one of the interference, collision rate, offset or latency to apply in its random access parameter determination. This may be indicated to the UE by the gNB, possibly as part of the table or as a separate message, or the UE may be preconfigured with such information. The table need not comprise all columns of the columns, but for example only that or those that the UE should use in the determination of the at least one RA parameter. The threshold(s) corresponding to one or more of interference, collision rate, or latency may be provided by the gNB (e.g. as part of the Table of FIG. 7) or may be preconfigured, for example.

The gNB 110 may determine the condition information, e.g. the SSB specific offsets (one for each SSB), based on the reception conditions that are currently prevailing on the UL resources corresponding to each SSB beam. That is, the condition information corresponding to SSB #1 is based on reception conditions prevailing for UL resources related to the SSB #1. Similarly, the thresholds may be determined by the gNB 110 SSB specifically, or as common to all SSBs.

Although there may be correlation between the different options for condition information, it is noted that e.g. the interference information (uncorrelated from the collision probability information) may provide advantages for example in scenarios when the interference is coming from external sources (e.g. neighbor cells) but collision probability on the SSB index is not a limiting factor.

Let us look further on how the different condition information elements may be used by the UE 120 to optimize the at least one random access parameter, such as the selectin of the SSB associated to the RA process and/or the number of PRACH repetitions.

In an embodiment related to the interference information 600, as shown in step 602 of FIG. 6, when the UE 120 determines that interference related to the set of UL resources on which the random access is to be performed is above an interference threshold, the UE 120 may increase the number of RA repetitions allowed to be performed, compared to a number of random access repetitions that would be allowed to be performed without considering the condition information. In other words, if the interference is above the predetermined interference threshold, the UE 12 could be allowed to transmit a higher number of repetitions than what would be derived merely from RSRP measurements (as in FIG. 3B).

As another embodiment related to the interference information 600, as shown in step 604 of FIG. 6, if the UE 120 determines that interference related to the set of UL resources on which the random access is to be performed is above the predetermined interference threshold, the UE may select another DL signal (e.g. select another SSB) with which the random access is to be associated with (e.g. select SSB #2 as shown with the X-mark in FIG. 3B). In other words, the UE 120 may UE analyze whether another SSB index has better RSRP and interference conditions than SSB #1 which would have been selected in FIG. 3B if the UE had used only the RSRP measurement.

As yet one embodiment related to the interference information 600, as shown in step 606 of FIG. 6, if interference level is smaller than the interference threshold, the UE 120 neither needs to re-select the SSB nor modify the number of PRACH repetitions.

In an embodiment related to the collision probability information 610, as shown in step 612 of FIG. 6, when the UE 120 determines that RA collision probability related to the set of UL resources on which the random access is to be performed is above a predetermined collision probability threshold and the UE determines that random access occasions (ROs) for the RA repetitions are shared between a plurality of UEs in the cell, the UE 120 may decide to reduce the number of RA repetitions allowed to be performed, compared to a number of RA repetitions that would be allowed to be performed without considering the condition information (e.g. compared to what would be derived merely from RSRP measurements, as in FIG. 3B). In other words, in the case shared ROs are used by the UEs for the repetitions (e.g. all UEs transmitting number N repetitions and starting from a certain RO will transmit in the same N ROs), the UE 120 may beneficially reduce the number of Msg1/MsgA repetitions than what would be derived from RSRP measurements or limits the number of Msg1/MsgA repetitions to a maximum value e.g. 4 PRACH repetitions instead of 8. This is because, since all UEs will repeat in the same ROs, it may be beneficial for the UE 120 to lower the number of repetitions to benefit from more repetition occasions (i.e. bundles of N ROs) in a certain time interval, thus lowering the corresponding collision probability.

As another embodiment related to the collision probability information 610, as shown in step 614 of FIG. 6, if the UE 120 determines as above that RA collision probability related to the set of UL resources on which the random access is to be performed is above the collision probability threshold and determines that RA occasions for the random access repetitions are pseudo-randomly selected, then the UE 120 may decide to increase the number of random access repetitions allowed to be performed, compared to a number of random access repetitions that would be allowed to be performed without considering the condition information (e.g. compared to what would be derived merely from RSRP measurements, as in FIG. 3B). In other words, in the case pseudo-random sequences of ROs are used by the UEs in the cell to transmit Msg1/MsgA with repetitions, increasing the number of repetitions may offer lower collision probability. This may be because the larger the number of ROs pseudo-randomly selected, the lower the probability of two UEs selecting exactly the same ROs is, and therefore the lower the collision probability.

As yet another embodiment related to the collision probability information 610, as shown in step 616 of FIG. 6, if the UE 120 determines that RA collision probability related to the set of UL resources on which the random access is to be performed is above the collision probability threshold, the UE 120 selects another DL signal (e.g. SSB index) with which the random access is to be associated with (e.g. what would be selected merely from RSRP measurements, as in FIG. 3A, e.g. select SSB #2 as shown with the X-mark in FIG. 3B). In other words, if the collision probability is above the threshold, the UE 120 may analyze whether another SSB index has better RSRP and collision probability conditions.

As yet further embodiment related to the collision probability information 610, as shown in step 618 of FIG. 6, if the UE 120 determines that relevant collision probability is smaller than the predetermined collision probability threshold, the UE 120 may not re-select the SSB or change the number of RA repetitions (PRACH repetitions) to be performed on the selected SSB index.

Although in connection of random access collision probability it has been explained that the UE 120 takes an action based on how ROs for repetitions are determined, in an embodiment the RO related criterion need not be used, and the UE 120 in an embodiment increases the RA repetitions if the indicated collision probability corresponding to the associated SSB index is higher than the predetermined threshold, or decreases the RA repetitions if the indicated collision probability corresponding to the associated SSB index is higher than the predetermined threshold.

In an embodiment related to the latency information 620, as shown in step 622 of FIG. 6, when the UE 120 determines that the average observed latency related to the set of UL resources on which the random access is to be performed is above a predetermined latency threshold, the UE 120 may reduce the number of RA repetitions allowed to be performed compared to a number of RA repetitions that would be allowed to be performed without considering the condition information (e.g. compared to what would be derived merely from RSRP measurements, as in FIG. 3B).

As another embodiment related to the latency information 620, as shown in step 624 of FIG. 6, if the UE 120 determines that average observed latency related to the set of UL resources on which the random access is to be performed is above a predetermined latency threshold, the UE 120 selects another DL signal (e.g. SSB index) with which the random access is to be associated with (e.g. what would be selected merely from RSRP measurements, as in FIG. 3A, e.g. select SSB #2 as shown with the X-mark in FIG. 3B). In other words, if the latency is above the threshold, the UE 120 may analyze whether another SSB index has better RSRP and latency conditions.

As yet further embodiment related to the latency information 620, as shown in step 626 of FIG. 6, if the UE 120 determines that relevant latency is smaller than the predetermined latency threshold, the UE 120 may not re-select the SSB or change the number of RA repetitions (PRACH repetitions) to be performed on the selected SSB index.

In an embodiment related to the offset 630 related condition information, as shown in step 632 of FIG. 6, the UE 120 applies the offset corresponding to the DL signal (e.g. SSB index) to which the random access is associated for adjusting at least one signal quality threshold. For example, the UE 120 may adjust the RSRP thresholds shown in FIG. 3B for the SSB index corresponding to the offset. The different offset may be given for each of the SSBs.

Figure 8:
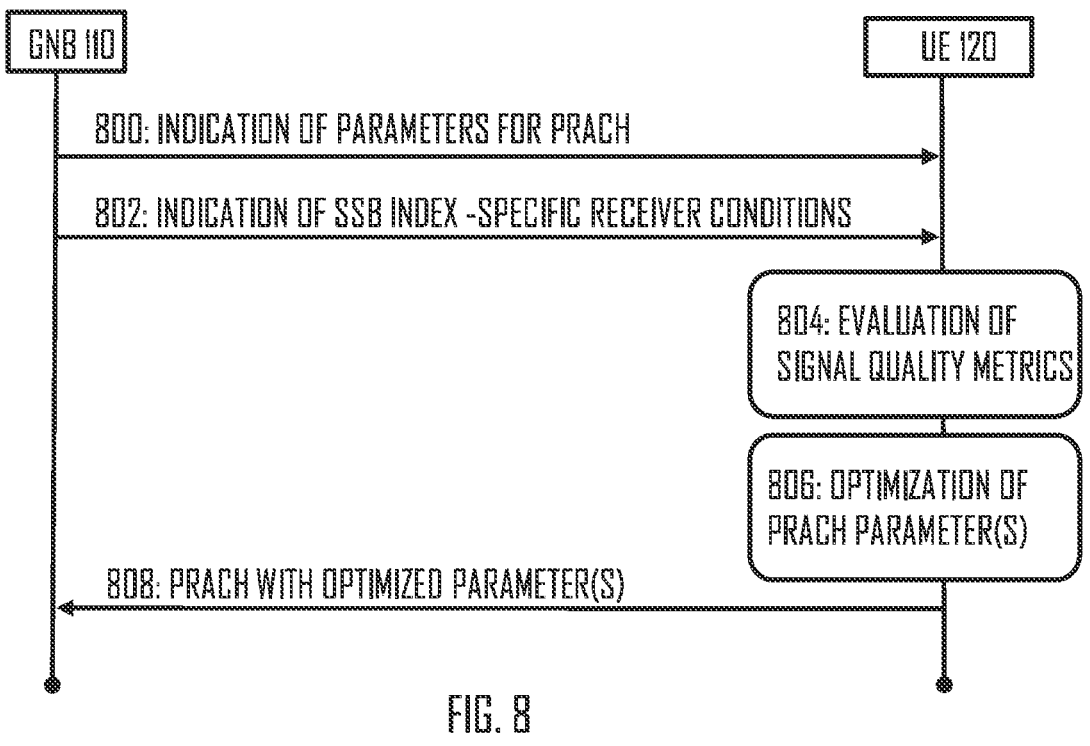
FIG. 8 depicts a signaling flow diagram between user equipment and network node, according to some embodiments.

FIG. 8 shows a signaling flow diagram between UE and a network node, such as the gNB 110, of the network. This example flow diagram is merely an embodiment and for example the steps shown in the flow diagram may be in different order in different embodiments.

In step 800, the gNB 110 indicates parameters for determination of the PRACH repetitions, such as RSRP threshold for choosing the number of RA repetitions at the UE 120.

In step 802, the gNB further indicates the condition information (also known as supplementary information) about receiver conditions per SSB, or other DL signal transmitted by the gNB 110 by using different spatial parameters for the transmission, such as in the form of beams. The condition information may be transmitted in the form of one or more parameters, such as shown in the table of FIG. 7. As mentioned, these parameters may be representative of e.g. at least one of interference conditions or PRACH collision probability or average observed latency from initial preamble transmission access procedure completion, experienced by the gNB 110 on UL resources corresponding to certain SSB index. This step may correspond to step 402 of FIG. 4.

In an embodiment, the condition information is valid for a predetermined time duration. For example, the UE 120 may receive information indicative of time domain validity of the condition information. In an embodiment, for example in connection of step 802 or otherwise, the network (e.g. the gNB 110) provides the UE 120 with additional information on the time wise validity of the conditional information. As one example, the information indicative of time domain validity of the condition information indicates an update periodicity of the condition information. For example, the UE 120 may receive information indicating periodicity and/or time during when this condition information is valid or when it will be updated. This may ease UE's implementation since it may reduce the periodicity with which UE 120 updates the SSB index related condition information.

In step 804, the UE 120 may evaluate signal quality of detected DL signals, such as of the SSBs. This may correspond to step 400 of FIG. 4.

However, owing to the embodiments presented, in step 806, the UE 120 may use it for optimization of e.g. PRACH resources and number of PRACH repetitions. This step may correspond to step 404 of FIG. 4.

Following presents some non-limiting embodiments of the execution of step 806.

A. As one example of PRACH repetitions optimization, the UE 120 receives in steps 800 and 802 three parameters for determination of PRACH repetitions, namely interference level measured at different SSB indexes, an interference threshold and RSRP thresholds. Then:
  i. UE determines a number of, e.g., 4 repetitions from the RSRP thresholds for a certain SSB index.
  ii. UE compares the interference level of this certain SSB index with the indicated interference threshold.
    1. If interference level is larger than the indicated interference threshold, the UE increases the number of PRACH repetitions to, e.g., 8.
    2. If interference level is smaller than the indicated interference threshold, the UE does not modify the number of PRACH repetitions and transmits 4 repetitions.

B. As another example of PRACH repetitions optimization, the UE 120 receives in steps 800 and 802 three parameters for determination of PRACH repetitions, namely the PRACH collision rate at different SSB indexes, a threshold on the collision rate and RSRP thresholds.
  i. UE determines a number of, e.g., 4 repetitions from the RSRP thresholds for a certain SSB index.
  ii. UE compares the collision rate of this certain SSB index with the indicated threshold on the collision rate.
    1. If collision rate is larger than the indicated threshold, UE adapts the number of PRACH repetitions to, e.g., 2 or e.g. 8, depending on the determination of the ROs for the PRACH repetitions.
    2. If collision is smaller than the indicated threshold, UE does not modify the number of PRACH repetitions and transmits 4 repetitions.

C. As one example of PRACH resources optimization, the UE 120 receives in steps 800 and 802 three parameters for determination of PRACH resources, namely interference level measured at different SSB indexes, an interference threshold and RSRP thresholds.
  i. UE determines a number of e.g. 4 repetitions from the RSRP thresholds for a certain SSB index.
  ii. UE compares the interference level of the certain SSB index with the indicated interference threshold.
    1. If interference level is larger than the indicated interference threshold, UE goes back to step C.i.

and performs the same procedure with a different SSB index (i.e. reselect SSB index). UE keeps doing this until the interference level is smaller than the indicated threshold. If none of the SSB indexes eligible for PRACH transmission satisfies this condition, UE transmits 4 repetitions on resources associated to the certain SSB index.
  2. If interference level is smaller than the indicated interference threshold, UE transmits 4 repetitions on resources associated to the certain SSB index.

D. As another example of PRACH resources optimization, the UE 120 receives in steps 800 and 802 three parameters for determination of PRACH resources, namely the PRACH collision rate at different SSB indexes, a threshold on the collision rate and RSRP thresholds.
  i. UE determines a number of e.g. 4 repetitions from the RSRP thresholds for a certain SSB index.
  ii. UE compares the collision rate of the certain SSB index with the indicated threshold on the collision rate.
    1. If collision is larger than the indicated threshold, UE goes back to step D.i. and performs the same procedure with a different SSB index. UE keeps doing this until the collision rate is smaller than the indicated threshold. If none of the SSB indexes eligible for PRACH transmission satisfies this condition, UE transmits 4 repetitions on resources associated to the certain SSB index.
    2. If collision rate is smaller than the indicated threshold, UE transmits 4 repetitions on resources associated to the certain SSB index.

E. As one example of PRACH repetitions optimization, the UE 120 receives in steps 800 and 802 two parameters for determination of PRACH repetitions, namely average observed latency from initial preamble transmission to access procedure completion at different SSB indexes and RSRP thresholds.
  i. UE determines a number of, e.g., 4 repetitions from the RSRP thresholds for a certain SSB index
  ii. UE compares the corresponding average observed latency, of the certain SSB index, from initial preamble transmission access procedure completion with an implementation-specific latency parameter associated with, e.g., an urgency level for completing the access procedure.
    1. If average observed latency from initial preamble transmission access procedure completion is larger than the implementation-specific latency parameter, UE decreases the number of PRACH repetitions to, e.g., 2.
    2. If average observed latency from initial preamble transmission access procedure completion is smaller than the implementation-specific latency parameter, UE does not modify the number of PRACH repetitions and transmits 4 repetitions F. As one example of PRACH repetitions optimization, the UE 120 receives in steps 800 and 802 two parameters for determination of PRACH repetitions, namely average observed latency from initial preamble transmission access procedure completion at different SSB indexes and RSRP thresholds.
  i. UE determines a number of, e.g., 4 repetitions from the RSRP thresholds for a certain SSB index
  ii. UE compares the average observed latency, of the certain SSB index, from initial preamble transmission access procedure completion of the certain SSB index an implementation-specific latency parameter associated with, e.g., an urgency level for completing the access procedure.

1. If average observed latency from initial preamble transmission access procedure completion is larger than the implementation-specific latency parameter, UE goes back to step F.i. and performs the same procedure with a different SSB index. UE keeps doing this until the average observed latency from initial preamble transmission access procedure completion is smaller than the implementation-specific latency parameter. If none of the SSB indexes eligible for PRACH transmission satisfies this condition, UE transmits 4 repetitions on resources associated to the certain SSB index.

2. If average observed latency from initial preamble transmission access procedure completion is smaller than the implementation-specific latency parameter, UE transmits 4 repetitions on resources associated to the certain SSB index.

It is worth noticing, that even if examples A-F are described separately for the sake of simplicity, they could be implemented together in order for a UE to concurrently optimize PRACH resources and repetitions, considering e.g. both the collision rate and the interference level per SSB index.

In an embodiment, the UE 120 uses any of the following alone or in combination for determining the at least one random access parameter (such as selection of SSB and/or the number of RA repetitions on the UL resources associated to the selected SSB): condition information indicating interference, condition information indicating collision probability, condition information indicating latency, and condition information indicating offset.

In an embodiment, the UE 120 is provided with priority information indicating priorities of different condition information IEs. For example, the priority information may indicate than in case of opposite indications from latency and interference related information elements, the condition information indicative of interference at the network is given more weight than the latency related information. This is just an example of the priority indication. Different embodiments may indicate different priorities between two or more of interference, collision probability, latency and offset.

Then in step 808 of FIG. 8, the UE 120 may perform the random access (procedure) with the optimized parameters. This may correspond to step 406 of FIG. 4.

Figure 9:
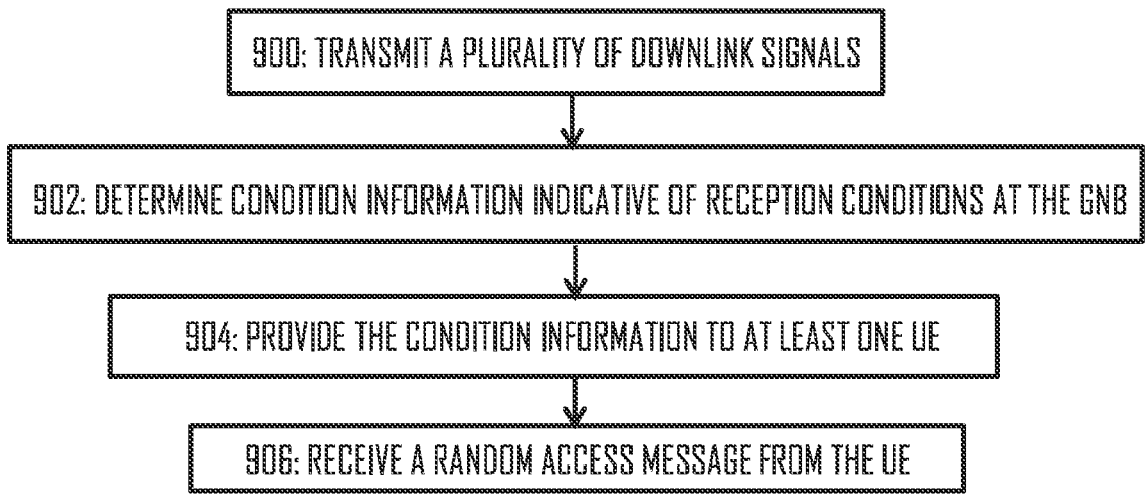
FIG. 9 shows a method, according to an embodiment.

FIG. 9 depicts an example method. The method may be computer-implemented. The method may be performed by the gNB 110, for example, or an apparatus (such as a chip) controlling the gNB 110). The order of the steps may vary from what is being shown in FIG. 9.

As shown in FIG. 9, the gNB 110 may in step 900 transmit a plurality of downlink signals, such as SSBs. There DL signals may be transmitted in a beam-based transmission, as depicted in FIG. 3A, for example.

In step 902, the gNB 110 determines the condition information indicative of reception conditions at the gNB 110. As said earlier, this may be SSB-specific information. The condition information may comprise, for at least one (but possibly for all) of the plurality of DL signals, information indicative of reception conditions related to the corresponding set of UL resources, wherein each DL signal corresponds to a specific set of UL resources. In an embodiment, the condition information comprises information indicative of at least one of the following: interference at the gNB 110, random access collision probability at the gNB 110, an average observed latency, at the gNB 110, from a transmission of a preamble triggering a random access procedure to a completion of the random access procedure, or an offset for adjusting at least one signal quality threshold.

In step 904, the gNB 110 provides the condition information to a user equipment. This may be transmitted in a SIB, for example, in the one or more of the plurality of DL signals. Broadcasting may be used.

In step 906, the gNB 110 receives a random access message from the UE (e.g. the UE 120). At least one parameter (e.g UL resources and/or PRACH repetitions) of the random access is based on the condition information. The random access message is received on a set of UL resources corresponding to a DL signal, of the plurality of DL signals, to which the random access is associated.

The proposed embodiments may provide the benefit that random access is performed with more optimized parameters compared to solutions where only SSB-RSRP and related SSB-RSRP thresholds are taken into account.

Related to the collision probability related condition information, a PRACH preamble collision is a known problem of the contention based random access procedure that may become more severe in the case of PRACH repetitions. In the following, two approaches are discussed as potentials for collision probability calculation of a certain SSB beam in which UEs (e.g. both CE UE and legacy UE) perform PRACH transmission.

In a first approach, the PRACH is using a Slotted Aloha as an access method for which preamble collision probability between contending system access attempts on a PRACH radio resource can be calculated as $$P(\text{collision}) = 1 - e^{-\frac{\gamma}{M}},$$

where M is the number of configured access opportunities per second, and $\gamma$ is the random access arrival rate per second. If we assume a constant random access arrival rate, it is clear how the number M of configured access opportunities per second drives the collision probability and lowers it the lower the value of M.

In a second approach, if Bernoulli distribution is used with the probability of $\sigma=\lambda/U$ per UE who performs PRACH transmission (with or without repetition) over suitable RO, where $\lambda$ denotes the overall arrival to the system, each UE who performs PRACH based on the given arrival rate, becomes activated and then decides to transmit. Attempting for the same preamble in a certain SSB results in collision in the system. Each collision causes all the involved Msg1/MsgA transmissions become failed and unsuccessful. This is when the involved UE with PRACH transmissions is called to remain backlogged.

The process of retransmission occurs when the backlogged UE is given another chance to transmit its PRACH. This process is fulfilled by using a probability p(t) for overall existing backlogged UE at instant time t. Therefore, the whole process will be continued with the probability p(t) until the transmission becomes successful. Moreover, each retransmission process is lossless meaning that any of N(t) backlogged UE can retransmit in a different time slot regardless of the given slot in the previous attempt. If we denote N(t) as the number of finite backlogged UE at number of time t, then we could easily reach a Markov process turns out to be ergodic where N(t) can be assumed as the system state where steady-state distribution exists.

Transition probabilities of being at specific state as result of this Markovian model could be characterized through the transition diagram. If we denote $\pi_i$ as the steady-state probability of the system being at state i, then we could define it as follows:

$$\lim_{t \to \infty} Prob[N(t) = i] \qquad (1)$$

Further, if we denote $P_{i,j}$ as the transmission probability from state i to j as follows:

$$P_{i,j} = \lim_{t \to \infty} Prob[N(t+1) = j | N(t) = i]. \qquad (2)$$

If we let $P = \{P_{i,j}\}$ represent the matrix whose elements are denoted by $P_{i,j}$, the steady-state probability vector $\pi$ which could guarantee the existence of a unique solution is expressed as:

$$\pi = \pi P, \sum_{t=0}^{U} \pi_i = 1, \qquad (3)$$

where U represents total number of UEs in the cell who performs PRACH with/without repetitions.

If there is i backlogged UEs at the embedded point N(t), after the possible following events we will reach j backlogged UEs at N(t+1):

a out of (U−bi) number of new activated UEs transmit their PRACH (with/without repetitions) immediately over M access opportunities.

n out of i backlogged UEs decide to transmit n+a UEs performs their PRACH over M access opportunities c out of n+a transmissions will be successfully transmitted Hence, if we take j=i+a−c, 0≤c≤min(M,n+a), n≤i, the transition matrix which produces all the transition probabilities can be derived as follows:

$$\sum_{a=max(0,j-i)}^{min(M+j-i,U-i)} \sum_{n=max(0,i-j)}^{i} \binom{U-i}{a} \qquad (4)$$
$$\sigma^a (1-\sigma)^{U-i-a} \times \binom{i}{n} p^n (1-p)^{i-n} S(U-i-a+j | n+a),$$

where S(U−i−a+j|n+a) represents the probability of unsuccessful PRACH transmissions or collision probability over M access opportunities where n+a UEs either among new arrivals to tramsmit first PRACH attempt or currently backlogged UEs simultaneously attempt to transmit.

Applying any of above two approaches, PRACH repetitions will effectively decrease the value of M by the value of PRACH repetitions the resources are associated with compared to the case of PRACH without repetitions.

Figure 10:
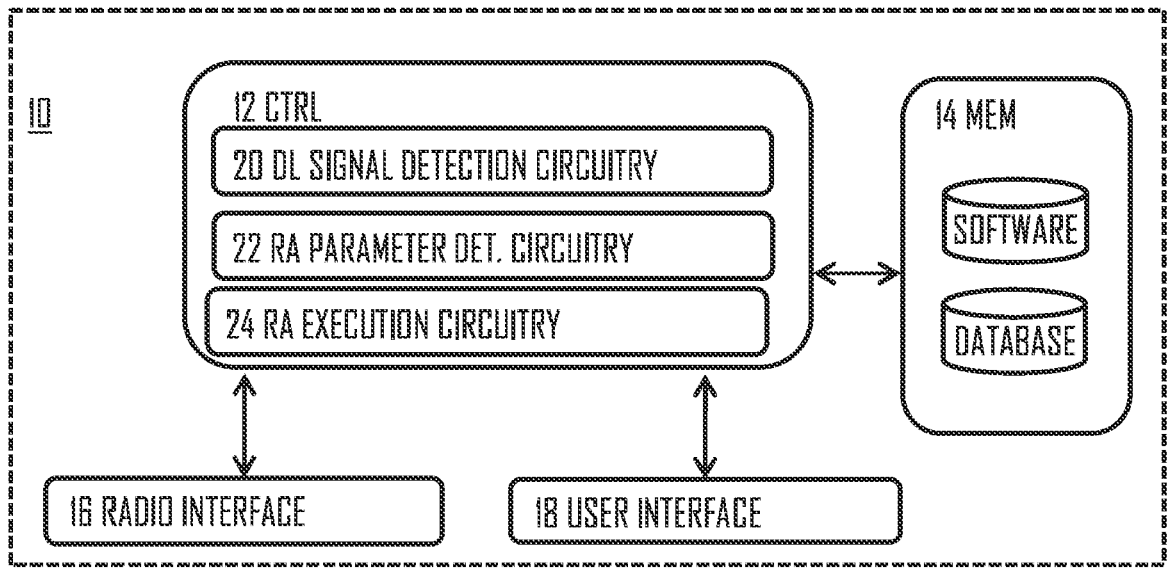
FIGS. 10 and 11 illustrate apparatuses, according to some embodiments.

An embodiment, as shown in FIG. 10, provides an apparatus 10 comprising a control circuitry (CTRL) 12, such as at least one processor, and at least one memory 14 storing instructions that, when executed by the at least one processor, cause the apparatus at least to carry out any one of the above-described processes. In an example, the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 10 may comprise the terminal device of a communication system, e.g. a user terminal (UT), a computer (PC), a laptop, a tabloid computer, a cellular phone, a mobile phone, a communicator, a smart phone, a palm computer, a mobile transportation apparatus (such as a car), a household appliance, or any other communication apparatus, commonly called as UE in the description. Alternatively, the apparatus is comprised in such a terminal device. Further, the apparatus may be or comprise a module (to be attached to the UE) providing connectivity, such as a plug-in unit, an "USB dongle", or any other kind of unit. The unit may be installed either inside the UE or attached to the UE with a connector or even wirelessly.

In an embodiment, the apparatus 10 is or is comprised in the UE 120. The apparatus may be caused to execute some of the functionalities of the above described processes, such as the steps of FIG. 4.

The apparatus may further comprise a radio interface (TRX) 16 comprising hardware and/or software for realizing communication connectivity according to one or more communication protocols. The TRX may provide the apparatus with communication capabilities to access the radio access network, for example.

The apparatus may also comprise a user interface 18 comprising, for example, at least one keypad, a microphone, a touch display, a display, a speaker, etc. The user interface may be used to control the apparatus by the user.

The control circuitry 12 may comprise a DL signal detection circuitry 20 e.g. for determining signal quality information on the DL signals, according to any of the embodiments. The control circuitry 12 may further comprise a RA parameter determination circuitry 22 for determining the at least one parameter for random access, according to any of the embodiments. The control circuitry 12 may further comprise a RA execution circuitry 22 for performing the random access based on the determined at least one parameter for random access, according to any of the embodiments.

Figure 11:
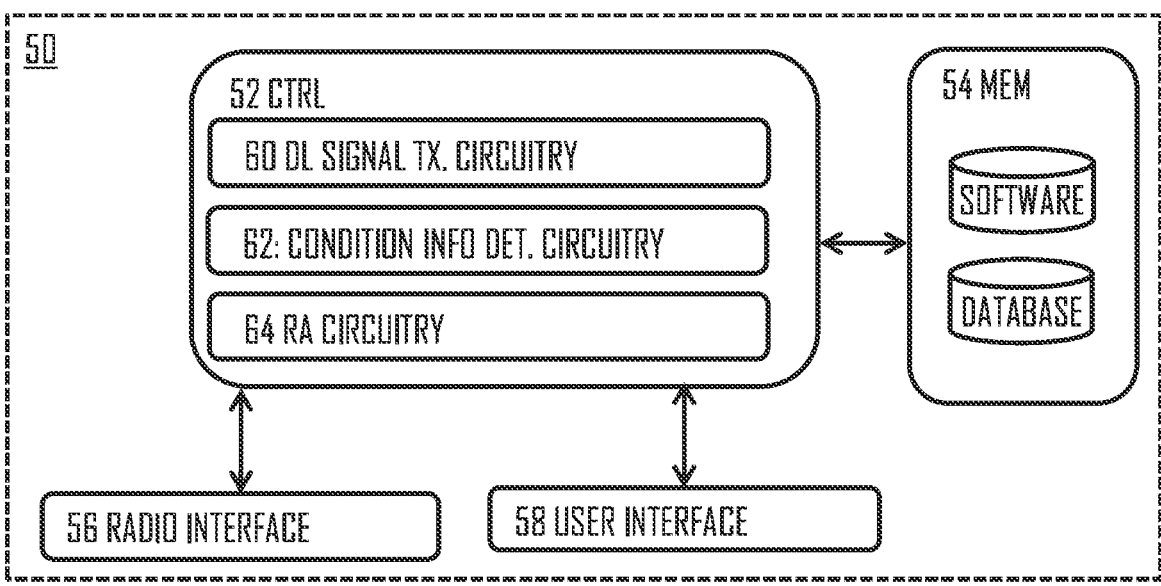

An embodiment, as shown in FIG. 11, provides an apparatus 50 comprising a control circuitry (CTRL) 52, such as at least one processor, and at least one memory 54 storing instructions that, when executed by the at least one processor, cause the apparatus at least to carry out any one of the above-described processes. In an example, the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 50 may be or be comprised in a network node, such as in gNB/gNB-CU/gNB-DU of 5G. In an embodiment, the apparatus is or is comprised in the network node 110. The apparatus may be caused to execute some of the functionalities of the above described processes, such as the steps of FIG. 9.

In an embodiment, a CU-DU (central unit-distributed unit) architecture is implemented. In such case the apparatus 50 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the radio node may be stand-alone apparatuses communicating with each other via a radio path or via a wired connection. Alternatively, they may be in a same entity communicating via a wired connection, etc. The edge cloud or edge cloud server may serve a plurality of radio nodes or a radio access networks. In an embodiment, at least some of the described processes may be performed by the central unit. In another embodiment, the apparatus may be instead comprised in the distributed unit, and at least some of the described processes may be performed by the distributed unit. In an embodiment, the execution of at least some of the functionalities of the apparatus 50 may be shared between two physically separate devices (DU and CU) forming one operational entity. Therefore, the apparatus may be seen to depict the operational entity comprising one or more physically separate devices for executing at least some of the described processes. In an embodiment, the apparatus controls the execution of the processes, regardless of the location of the apparatus and regardless of where the processes/functions are carried out.

The apparatus may further comprise communication interface (TRX) 56 comprising hardware and/or software for realizing communication connectivity according to one or more communication protocols. The TRX may provide the apparatus with communication capabilities to access the radio access net-work, for example. The apparatus may also comprise a user interface 58 comprising, for example, at least one keypad, a microphone, a touch display, a display, a speaker, etc. The user interface may be used to control the apparatus by the user.

The control circuitry 52 may comprise a DL signal transmission circuitry 60 for transmitting the DL signals to the UE, according to any of the embodiments. The control circuitry 52 may comprise condition information determination circuity 62 e.g. for determining the DL signal-specific condition information, according to any of the embodiments, and for transmitting the condition information to at least one UE in the cell, according to any of the embodiments. The control circuitry 52 may comprise a random access circuitry 64 for communicating with the UE during a random access procedure (e.g. transmission of RAR), according to any of the embodiments.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

A term non-transitory, as used herein, is a limitation of the medium itself (i.e. tangible, not a signal) as opposed to a limitation on data storage persistency (e.g. RAM vs. ROM).

As used herein the term "means" is to be construed in singular form, i.e. referring to a single element, or in plural form, i.e. referring to a combination of single elements. Therefore, terminology "means for [performing A, B, C]", is to be interpreted to cover an apparatus in which there is only one means for performing A, B and C, or where there are separate means for performing A, B and C, or partially or fully overlapping means for performing A, B, C. Further, terminology "means for performing A, means for performing B, means for performing C" is to be interpreted to cover an apparatus in which there is only one means for performing A, B and C, or where there are separate means for performing A, B and C, or partially or fully overlapping means for performing A, B, C.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FP-GAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Following is a list of some aspects of the invention.

According to a first aspect, there is provided a method, comprising: obtaining signal quality information on a plurality of downlink (DL) signals of a cell; receiving, from a network node of the cell, condition information indicative of reception conditions at the network node; based on the signal quality information and the condition information, determining at least one parameter for performing a random access to the cell; performing, based on the determined at least one parameter, the random access to the cell on a set of uplink (UL) resources.

Various embodiments of the first aspect may comprise at least one feature from the following bulleted list:

at least one signal quality threshold; and wherein determining the at least one parameter is further based on comparing the signal quality information to the at least one signal quality threshold.

wherein the at least one signal quality threshold is shared by the plurality of DL signals.

wherein each DL signal comprises a synchronization signal block and/or a channel state information reference signal.

wherein determining the at least one parameter comprises at least one of: selecting, based on the signal quality information and the condition information, a DL signal of the plurality of DL signals to which the random access is associated, and determining the set of UL resources corresponding to the DL signal for performing the random access, or determining, based on the signal quality information and the condition information, a number of random access repetitions allowed to be performed.

wherein selecting the DL signal is further based on comparing the signal quality information to at least one signal quality threshold, or wherein determining the number of random access repetitions is further based on comparing the signal quality information to the at least one signal quality threshold.

wherein performing random access comprises transmitting Msg1 or MsgA, and wherein the number of repetitive transmissions of the Msg1 or MsgA is capped by the determined number of random access repetitions.

wherein the condition information is received in a system information block (SIB).

wherein the condition information is receivable on each DL signal of the cell.

wherein the condition information is different for different DL signals.

wherein the condition information comprises, for at least one of the plurality of DL signals, information indicative of reception conditions related to a corresponding set of UL resources, wherein each DL signal corresponds to a specific set of UL resources.

wherein the condition information comprises information indicative of interference at the network node.

determine that interference related to the set of UL resources on which the random access is to be performed is above an interference threshold; and increase a number of random access repetitions allowed to be performed compared to a number of random access repetitions that would be allowed to be performed without considering the condition information.

determine that interference related to the set of UL resources on which the random access is to be performed is above an interference threshold; and select another DL signal with which the random access is to be associated with.

wherein the condition information comprises information indicative of a random access collision probability at the network node.

determine that random access collision probability related to the set of UL resources on which the random access is to be performed is above a collision probability threshold; determine that random access occasions for the random access repetitions are shared between a plurality of user equipments; reduce a number of random access repetitions allowed to be performed compared to a number of random access repetitions that would be allowed to be performed without considering the condition information.

determine that random access collision probability related to the set of UL resources on which the random access is to be performed is above a collision probability threshold; determine that random access occasions for the random access repetitions are pseudo-randomly selected; increase a number of random access repetitions allowed to be performed compared to a number of random access repetitions that would be allowed to be performed without considering the condition information.

determine that random access collision probability related to the set of UL resources on which the random access is to be performed is above a collision probability threshold; and select another DL signal with which the random access is to be associated with.

wherein the condition information comprises information indicative of an average observed latency, at the network node, from a transmission of a preamble triggering a random access procedure to a completion of the random access procedure.

determine that the average observed latency related to the set of UL resources on which the random access is to be performed is above a latency threshold; and reduce a number of random access repetitions allowed to be performed compared to a number of random access repetitions that would be allowed to be performed without considering the condition information.

determine that the average observed latency related to the set of UL resources on which the random access is to be performed is above a latency threshold; and select another DL signal with which the random access is to be associated with.

wherein the condition information comprises an offset, and apply the offset corresponding to the DL signal to which the random access is associated for adjusting at least one signal quality threshold.

wherein the condition information is valid for a predetermined time duration.

receive information indicative of time domain validity of the condition information.

wherein the information indicative of time domain validity of the condition information indicates an update periodicity of the condition information.

According to a second aspect, there is provided a method, comprising: transmitting a plurality of downlink signals; determining condition information indicative of reception conditions at a network node; providing the condition information to a user equipment; receiving a random access message from the user equipment, wherein at least one parameter of the random access is based on the condition information, and wherein the random access message is received on a set of uplink (UL) resources.

Various embodiments of the second aspect may comprise at least one feature from the following bulleted list:

wherein the condition information comprises, for at least one of the plurality of DL signals, information indicative of reception conditions related to a corresponding set of UL resources, wherein each DL signal corresponds to a specific set of UL resources.

wherein the condition information comprises information indicative of at least one of the following: interference at the network node, random access collision probability at the network node, an average observed latency, at the network node, from a transmission of a preamble triggering a random access procedure to a completion of the random access procedure, or an offset for adjusting at least one signal quality threshold.

wherein the condition information is provided in a system information block (SIB).

wherein the condition information is provided in each DL signal.

wherein the condition information is different for different DL signals.

wherein each DL signal comprises a synchronization signal block and/or a channel state information reference signal.

According to a third aspect, there is provided an apparatus, comprising: at least one processor; and at least one memory storing instructions that, when executed by the at least one processor, cause the apparatus at least to: obtain signal quality information on a plurality of downlink (DL) signals of a cell; receive, from a network node of the cell, condition information indicative of reception conditions at the network node; based on the signal quality information and the condition information, determine at least one parameter for performing a random access to the cell; perform, based on the determined at least one parameter, the random access to the cell on a set of uplink (UL) resources.

Various embodiments of the third aspect may comprise at least one feature from the bulleted list under the first aspect.

According to a fourth aspect, there is provided an apparatus, comprising: at least one processor; and at least one memory storing instructions that, when executed by the at least one processor, cause the apparatus at least to: transmit a plurality of downlink signals; determine condition information indicative of reception conditions at the apparatus; provide the condition information to a user equipment; and receive a random access message from the user equipment, wherein at least one parameter of the random access is based on the condition information, and wherein the random access message is received on a set of uplink (UL) resources.

Various embodiments of the fourth aspect may comprise at least one feature from the bulleted list under the second aspect.

According to a fifth aspect, there is provided a computer program product embodied on a distribution medium and comprising program instructions which, when executed by an apparatus, cause the apparatus to carry out the method according to the first aspect.

According to a sixth aspect, there is provided a computer program product embodied on a distribution medium and comprising program instructions which, when executed by an apparatus, cause the apparatus to carry out the method according to the second aspect.

According to a seventh aspect, there is provided a computer program product comprising program instructions which, when executed by an apparatus, cause the apparatus to carry out the method according to the first aspect.

According to an eight aspect, there is provided a computer program product comprising program instructions which, when executed by an apparatus, cause the apparatus to carry out the method according to the second aspect.

According to a ninth aspect, there is provided an apparatus, comprising means for performing the method according to the first aspect, and/or means configured to cause the apparatus to perform the method according to the first aspect.

According to a tenth aspect, there is provided an apparatus, comprising means for performing the method according to the second aspect, and/or means configured to cause the apparatus to perform the method according to the second aspect.

According to an eleventh aspect, there is provided computer implemented system, comprising: a server and at least one radio node; and at least one processor and at least one memory storing instructions that, when executed by the at least one processor, cause the system at least to carry out the method according to the first aspect and/or the method according to the second aspect.

According to a twelfth aspect, there is provided computer implemented system, comprising: one or more processors; at least one data storage, and one or more computer program instructions to be executed by the one or more processors in association with the at least one data storage for carrying out the method according to the first aspect and/or the method according to the second aspect.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:

at least one processor; and at least one non-transitory memory storing instructions that, when executed by the at least one processor, cause the apparatus to operate as a 5G new radio (NR) user equipment (UE) to perform the following operations:

obtain signal quality information comprising layer-1 reference signal received power (L1-RSRP) measurements for a plurality of synchronization signal blocks (SSBs) detected in a beam-sweeping burst of a cell;

receive, from a gNB of the cell, system information comprising a time-varying, SSB-indexed table that (i) is broadcast in a system information block (SIB) and (ii) for each SSB includes 2-bit quantized values of: (a) interference or noise power at the gNB on uplink resources corresponding to the SSB, (b) random-access (RA) collision probability, and (c) an average observed latency from preamble transmission to RA completion, together with (iii) a per-SSB RSRP-threshold offset and (iv) threshold values and an update periodicity applicable to the quantized values;

based on both the L1-RSRP measurements and the received table, determine a particular SSB index with which to associate a contention-based four-step random access (CBRA) procedure and a maximum number of physical random access channel (PRACH) repetitions, wherein the determining comprises:

adjusting an RSRP threshold by the per-SSB offset and, responsive to an interference value for a highest-RSRP SSB exceeding the interference threshold, selecting instead a different SSB having next-highest RSRP whose interference value does not exceed the interference threshold;

responsive to a collision-probability value for the selected SSB exceeding a collision threshold and the UE determining that RA repetition occasions are shared among UEs, reducing the maximum number of PRACH repetitions relative to a number derived from the adjusted RSRP threshold, but responsive to the collision-probability value exceeding the collision threshold and the UE determining that repetition occasions are pseudo-randomly selected, increasing the maximum number of PRACH repetitions;

responsive to an average-latency value for the selected SSB exceeding a latency threshold:

decreasing the maximum number of PRACH repetitions or re-selecting the SSB; and applying a priority in which interference information takes precedence over latency information when indications conflict; and perform the random access based on the determined SSB index and maximum number of PRACH repetitions by transmitting Msg1 preambles on PRACH uplink resources mapped from the determined SSB index according to an SSB-to-random-access-occasion mapping signaled in SIB1, with the number of Msg1 transmissions capped by the maximum number of PRACH repetitions and terminated early upon receipt of a random access response (Msg2).

2. The apparatus of claim 1, wherein the condition information is received in a system information block (SIB) broadcast by the gNB, the SIB including an SSB-indexed table having quantized values of interference, collision probability, latency, and offset, each encoded in 2 bits.

3. The apparatus of claim 2, wherein determining the at least one parameter comprises applying a per-SSB offset to an RSRP threshold configured by the gNB to adjust the number of PRACH repetitions.

4. The apparatus of claim 3, wherein the at least one parameter comprises a maximum number of PRACH repetitions, and the apparatus terminates Msg1 transmissions early when a random access response (Msg2) is received prior to completing all repetitions.

5. The apparatus of claim 4, wherein determining the at least one parameter further comprises reducing the number of PRACH repetitions when the received collision probability for a selected SSB index exceeds a collision threshold and random access occasions are shared among UEs in the cell.

6. The apparatus of claim 4, wherein determining the at least one parameter further comprises increasing the number of PRACH repetitions when the received collision probability for a selected SSB index exceeds a collision threshold and the random access occasions are pseudo-randomly selected among UEs in the cell.

7. The apparatus of claim 6, wherein the condition information includes an update periodicity, and the apparatus applies the condition information only during a validity duration indicated by the gNB.

8. A system comprising:

an apparatus:

at least one processor; and at least one non-transitory memory storing instructions that, when executed by the at least one processor, cause the apparatus to operate as a 5G new radio (NR) user equipment (UE) to perform the following operations:

obtain signal quality information comprising layer-1 reference signal received power (L1-RSRP) measurements for a plurality of synchronization signal blocks (SSBs) detected in a beam-sweeping burst of a cell;

receive, from a gNB of the cell, system information comprising a time-varying, SSB-indexed table that (i) is broadcast in a system information block (SIB) and (ii) for each SSB includes 2-bit quantized values of: (a) interference or noise power at the gNB on uplink resources corresponding to the SSB, (b) random-access (RA) collision probability, and (c) an average observed latency from preamble transmission to RA completion, together with (iii) a per-SSB RSRP-threshold offset and (iv) threshold values and an update periodicity applicable to the quantized values;

based on both the L1-RSRP measurements and the received table, determine a particular SSB index with which to associate a contention-based four-step random access (CBRA) procedure and a maximum number of physical random access channel (PRACH) repetitions, wherein the determining comprises:

adjusting an RSRP threshold by the per-SSB offset and, responsive to an interference value for a highest-RSRP SSB exceeding the interference threshold, selecting instead a different SSB having next-highest RSRP whose interference value does not exceed the interference threshold;

responsive to a collision-probability value for the selected SSB exceeding a collision threshold and the UE determining that RA repetition occasions are shared among UEs, reducing the maximum number of PRACH repetitions relative to a number derived from the adjusted RSRP threshold, but responsive to the collision-probability value exceeding the collision threshold and the UE determining that repetition occasions are pseudo-randomly selected, increasing the maximum number of PRACH repetitions;

responsive to an average-latency value for the selected SSB exceeding a latency threshold:

decreasing the maximum number of PRACH repetitions or re-selecting the SSB; and applying a priority in which interference information takes precedence over latency information when indications conflict; and perform the random access based on the determined SSB index and maximum number of PRACH repetitions by transmitting Msg1 preambles on PRACH uplink resources mapped from the determined SSB index according to an SSB-to-random-access-occasion mapping signaled in SIB1, with the number of Msg1 transmissions capped by the maximum number of PRACH repetitions and terminated early upon receipt of a random access response (Msg2).

9. The apparatus of claim 8, wherein the condition information is received in a system information block (SIB) broadcast by the gNB, the SIB including an SSB-indexed table having quantized values of interference, collision probability, latency, and offset, each encoded in 2 bits.

10. The apparatus of claim 9, wherein determining the at least one parameter comprises applying a per-SSB offset to an RSRP threshold configured by the gNB to adjust the number of PRACH repetitions.

11. The apparatus of claim 10, wherein the at least one parameter comprises a maximum number of PRACH repetitions, and the apparatus terminates Msg1 transmissions early when a random access response (Msg2) is received prior to completing all repetitions.

12. The apparatus of claim 11, wherein determining the at least one parameter further comprises reducing the number of PRACH repetitions when the received collision probability for a selected SSB index exceeds a collision threshold and random access occasions are shared among UEs in the cell.

13. The apparatus of claim 11, wherein determining the at least one parameter further comprises increasing the number of PRACH repetitions when the received collision probability for a selected SSB index exceeds a collision threshold and the random access occasions are pseudo-randomly selected among UEs in the cell.

14. The apparatus of claim 12, wherein the condition information includes an update periodicity, and the apparatus applies the condition information only during a validity duration indicated by the gNB.

15. A method performed by a 5G new radio (NR) user equipment (UE), the method comprising:

obtaining signal quality information comprising layer-1 reference signal received power (L1-RSRP) measurements for a plurality of synchronization signal blocks (SSBs) detected in a beam-sweeping burst of a cell;

receiving, from a gNB of the cell, system information comprising a time-varying, SSB-indexed table that (i) is broadcast in a system information block (SIB) and (ii) for each SSB includes 2-bit quantized values of: (a) interference or noise power at the gNB on uplink resources corresponding to the SSB, (b) random-access (RA) collision probability, and (c) an average observed latency from preamble transmission to RA completion, together with (iii) a per-SSB RSRP-threshold offset and (iv) threshold values and an update periodicity applicable to the quantized values;

based on both the L1-RSRP measurements and the received table, determining a particular SSB index with which to associate a contention-based four-step random access (CBRA) procedure and a maximum number of physical random access channel (PRACH) repetitions, wherein the determining comprises:

adjusting an RSRP threshold by the per-SSB offset and, responsive to an interference value for a highest-RSRP SSB exceeding the interference threshold, selecting instead a different SSB having next-highest RSRP whose interference value does not exceed the interference threshold;

responsive to a collision-probability value for the selected SSB exceeding a collision threshold and the UE determining that RA repetition occasions are shared among UEs, reducing the maximum number of PRACH repetitions relative to a number derived from the adjusted RSRP threshold, but responsive to the collision-probability value exceeding the collision threshold and the UE determining that repetition occasions are pseudo-randomly selected, increasing the maximum number of PRACH repetitions;

responsive to an average-latency value for the selected SSB exceeding a latency threshold:

decreasing the maximum number of PRACH repetitions or re-selecting the SSB; and applying a priority in which interference information takes precedence over latency information when indications conflict; and performing the random access based on the determined SSB index and maximum number of PRACH repetitions by transmitting Msg1 preambles on PRACH uplink resources mapped from the determined SSB index according to an SSB-to-random-access-occasion mapping signaled in SIB1, with the number of Msg1 transmissions capped by the maximum number of PRACH repetitions and terminated early upon receipt of a random access response (Msg2).

16. The method of claim 15, wherein the condition information is received in a system information block (SIB) broadcast by the gNB, the SIB including an SSB-indexed table having quantized values of interference, collision probability, latency, and offset, each encoded in 2 bits.

17. The method of claim 16, wherein determining the at least one parameter comprises applying a per-SSB offset to an RSRP threshold configured by the gNB to adjust the number of PRACH repetitions.

18. The method of claim 17, wherein the at least one parameter comprises a maximum number of PRACH repetitions, and the apparatus terminates Msg1 transmissions early when a random access response (Msg2) is received prior to completing all repetitions.

19. The method of claim 18, wherein determining the at least one parameter further comprises reducing the number of PRACH repetitions when the received collision probability for a selected SSB index exceeds a collision threshold and random access occasions are shared among UEs in the cell, wherein the condition information includes an update periodicity, and the apparatus applies the condition information only during a validity duration indicated by the gNB.

20. The method of claim 18, wherein determining the at least one parameter further comprises increasing the number of PRACH repetitions when the received collision probability for a selected SSB index exceeds a collision threshold and the random access occasions are pseudo-randomly selected among UEs in the cell, wherein the condition information includes an update periodicity, and the apparatus applies the condition information only during a validity duration indicated by the gNB.

\*  \*  \*  \*  \*